United States Patent
Sharpe

(10) Patent No.: US 8,405,011 B2
(45) Date of Patent: Mar. 26, 2013

(54) TARGET TRACKING DEVICE AND METHOD

(75) Inventor: Michael Charles Sharpe, Billericay (GB)

(73) Assignee: Selex Galileo Ltd., Essex (GB)

( * ) Notice: Subject to any disclaimer, the term of this patent is extended or adjusted under 35 U.S.C. 154(b) by 373 days.

(21) Appl. No.: 12/651,881

(22) Filed: Jan. 4, 2010

(65) Prior Publication Data

US 2010/0200690 A1 Aug. 12, 2010

Related U.S. Application Data

(63) Continuation of application No. 12/073,405, filed on Mar. 5, 2008, now abandoned.

(30) Foreign Application Priority Data

Mar. 8, 2007 (GB) .................................. 0704493.6

(51) Int. Cl.
*F41G 7/22* (2006.01)
*F41G 7/00* (2006.01)
(52) U.S. Cl. ....... 244/3.16; 244/3.1; 244/3.15; 244/3.19
(58) Field of Classification Search .......... 244/3.1–3.19, 244/3.2–3.3; 342/61–65, 89, 90, 175, 194, 342/195; 89/1.11
See application file for complete search history.

(56) References Cited

U.S. PATENT DOCUMENTS

| | | | |
|---|---|---|---|
| 3,065,931 A | 11/1962 | Dixon et al. | |
| 3,416,752 A | 12/1968 | Hembree | |
| 3,421,716 A | 1/1969 | Buxton et al. | |
| 3,564,257 A | 2/1971 | Berry et al. | |
| 3,579,239 A * | 5/1971 | Purcell et al. | 342/62 |
| 3,841,585 A | 10/1974 | Evbers-Euterneck | |
| 3,912,859 A * | 10/1975 | Christopherson | 244/3.16 |
| 3,944,167 A | 3/1976 | Figler et al. | |
| 3,949,955 A * | 4/1976 | Sykes et al. | 244/3.19 |
| 3,970,269 A | 7/1976 | Conforti | |
| 4,006,356 A * | 2/1977 | Johnson et al. | 244/3.16 |
| 4,131,254 A | 12/1978 | Underwood | |
| 4,136,343 A * | 1/1979 | Heffner et al. | 244/3.19 |
| 4,156,875 A | 5/1979 | Keane et al. | |
| 4,162,775 A | 7/1979 | Voles | |
| 4,219,816 A * | 8/1980 | Schenkel et al. | 342/89 |
| 4,256,275 A * | 3/1981 | Flick et al. | 244/3.19 |
| 4,264,907 A | 4/1981 | Durand et al. | |
| 4,381,090 A | 4/1983 | Garner | |
| 4,442,431 A * | 4/1984 | Bleakney | 342/62 |
| 4,486,756 A * | 12/1984 | Peregrim et al. | 342/62 |

(Continued)

FOREIGN PATENT DOCUMENTS

| | | |
|---|---|---|
| DE | 3004250 | 8/1981 |
| GB | 2166314 | 4/1986 |

(Continued)

*Primary Examiner* — Bernarr Gregory
(74) *Attorney, Agent, or Firm* — Buchanan Ingersoll & Rooney PC

(57) ABSTRACT

A target tracking device incorporating a Position Sensitive Detector (PSD) 1 is described. A target is illuminated by a laser of a suitable wavelength. The target reflects the laser radiation and the reflected radiation is incident on a flying vehicle carrying a target tracking device. The PSD in the device outputs a signal representative of the position of the incident laser spot. The output signal is input into control electronics, the control electronics incorporating a resistive transimpedance amplifier. A higher than usual bias voltage is applied to the PSD yielding improved pulse response of the target tracking device. Therefore, the tracking device is particularly suited for use with a target marking laser having a short pulse duration.

14 Claims, 1 Drawing Sheet

U.S. PATENT DOCUMENTS

| | | | |
|---|---|---|---|
| 4,490,719 A | 12/1984 | Botwin et al. | |
| 4,500,051 A * | 2/1985 | Cottle et al. | 244/3.16 |
| 4,501,399 A * | 2/1985 | Loomis, III | 244/3.13 |
| 4,524,359 A * | 6/1985 | Champagne | 342/89 |
| 4,949,917 A * | 8/1990 | Cottle et al. | 244/3.16 |
| 4,950,076 A * | 8/1990 | Jarrett | 244/3.16 |
| 5,061,930 A | 10/1991 | Nathanson et al. | |
| 5,129,595 A * | 7/1992 | Thiede et al. | 244/3.16 |
| 5,241,316 A | 8/1993 | Pringle | |
| 5,473,331 A * | 12/1995 | Kennedy et al. | 342/62 |
| 5,475,391 A | 12/1995 | Spencer | |
| 5,486,831 A * | 1/1996 | Rowland et al. | 342/62 |
| 6,087,974 A * | 7/2000 | Yu | 342/62 |
| 6,097,481 A | 8/2000 | Coffey et al. | |
| 6,462,326 B1 | 10/2002 | Cleaver | |
| 6,568,629 B1 * | 5/2003 | Perrin et al. | 244/3.14 |
| 6,596,976 B2 * | 7/2003 | Lin et al. | 244/3.2 |
| 7,154,590 B2 * | 12/2006 | Williams et al. | 342/62 |
| 7,221,436 B1 * | 5/2007 | Mendenhall et al. | 244/3.16 |
| 7,304,283 B2 | 12/2007 | Tholl et al. | |
| 7,397,549 B2 * | 7/2008 | Williams et al. | 342/62 |
| 7,575,190 B2 * | 8/2009 | Sallee | 244/3.16 |

FOREIGN PATENT DOCUMENTS

| | | |
|---|---|---|
| GB | 2415310 | 12/2005 |

* cited by examiner

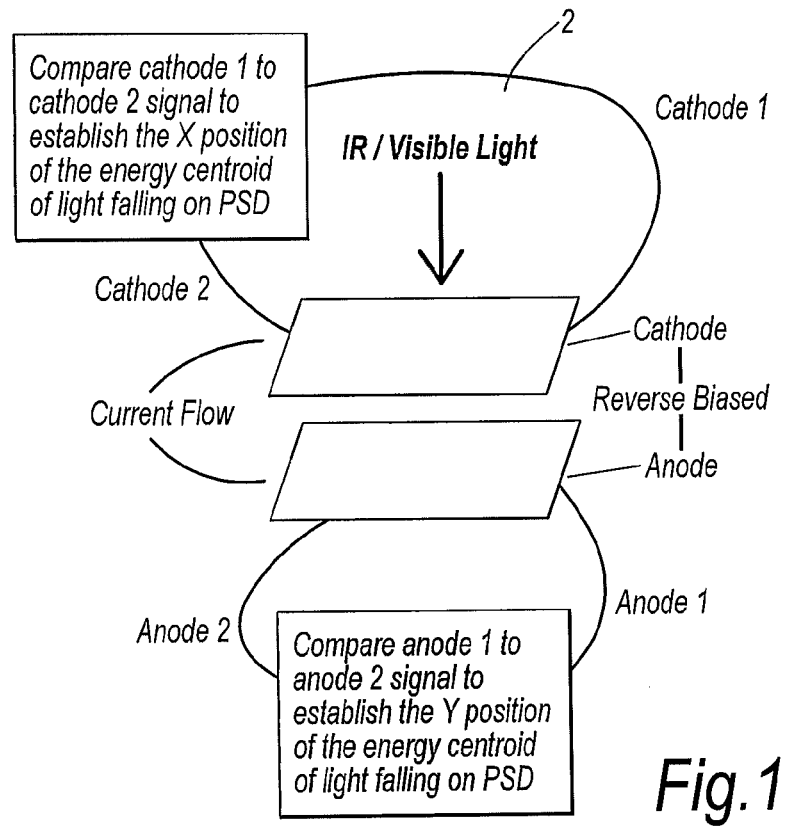
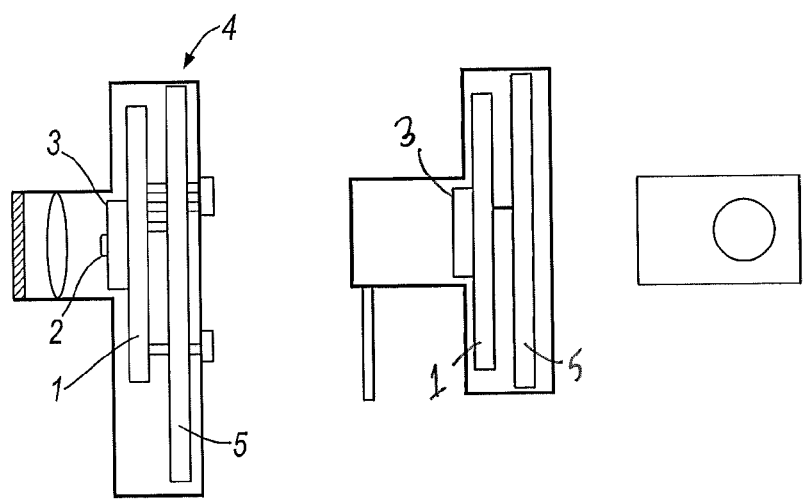

TARGET TRACKING DEVICE AND METHOD

CROSS-REFERENCE TO RELATED APPLICATIONS

This application is a continuation of U.S. application Ser. No. 12/073,405, filed on Mar. 5, 2008, now abandoned, which claims the benefit of foreign priority from Great Britain No. 0704493.6, filed on Mar. 8, 2007, the disclosures of which are incorporated herein in their entireties by reference.

FIELD

The invention relates to a target tracking device. More specifically, but not exclusively, the invention relates to a target tracking device comprising a position sensitive detector, thereby enabling a fast response time of the device.

BACKGROUND

Simple flight vehicles, such as gliding or guided bombs or defence rockets can be directed to their targets with the aid of a laser guiding system. An operator 'lights' a target with suitable radiation and the tracking device detects the radiation spot on the target and guides the flight vehicle towards the target. In order to detect the radiation on the target, a target guiding device can comprise a detector for example, a quadrant detector, where the radiation is incident on four detector cells. The flight vehicle is directed toward the target such that the same parts of the radiation spot are imaged on the four detector cells. However, as such a narrow non-detecting area is arranged between the detector cells, the target tracking can result in errors.

Alternative detectors have been proposed. For example GB-A-2415310 discloses a target tracking device utilising a Position Sensitive Detector (PSD) in an integrating pre-amplifier system. In such a configuration, pulses output by the PSD in response to the incident radiation are integrated and, after some signal processing by control electronics, a control signal is output, capable of directing the flight vehicle toward the target.

It is a disadvantage of a device incorporating a PSD that integrating pulses can result in energy loss, particularly in the energy not immediately detected as the pulse time is short but the response time of the PSD is relatively long.

SUMMARY

According to the invention there is provided a target tracking device for a flight vehicle including a position sensitive detector having at least two signal outputs, the signal outputs being processed by control electronics, the control electronics sampling, amplifying and optimising the impulse response of the position sensitive device.

According to the invention, there is further provided a method of tracking a target comprising the steps of:
(a) illuminating the target with radiation of a suitable wavelength;
(b) detecting radiation reflected or emitted by the target using a position sensitive detector;
(c) the pulses output by the position sensitive detector in response to the incident radiation, into a resistive transimpedance amplifier; and
(d) analysing the data output by the amplifier using suitable control electronics, the subsequent data produced being used to alter the trajectory of a flight vehicle incident on the target.

DESCRIPTION OF THE DRAWINGS

The invention will now be described with reference to the following diagrammatic drawings in which;

FIG. 1 shows a diagrammatic drawing of a position sensitive device (PSD) as used in one embodiment of the invention, the PSD providing an analogue output ($I_1$, $I_2$) directly proportional to the position of a radiation spot on the detector surface;

FIG. 2 shows plan and side views of the PSD of FIG. 1, in situ in one form of target tracking device, the target tracking device further including an optical lens system for focussing the incident radiation on the surface of the PSD and control electronics for processing signals output by the PSD.

DETAILED DESCRIPTION

FIG. 1 shows a PSD 1. The PSD 1 is a photodiode that provides an analog output $I_1$, $I_2$ directly proportional to the position of a radiation spot 2 on the active area 3 of the detector. The photodiode may be a silicon photodiode or a photodiode formed from any other material suitable for operation at alternative radiation wavelengths. The method of operation of PSDs is known in the art therefore a detailed description will not be included here. The outputs of the PSD effectively track the motion of the peak intensity of radiation incident on the detector surface. A single element can determine the position of the radiation spot in two axes by having four contacts attached to the detector. Signal levels from the four contacts are used to determine the position of the energy centroid of the spot.

FIG. 2 shows the PSD 1 of FIG. 1 in a target tracking device 4. The output $I_1$, $I_2$ of the PSD 1 is input into the control electronics 5. The control electronics 5 include a non-integrating resistive transimpedance amplifier (RTIA). The RTIA (not shown) samples pulses representative of the position of the radiation spot on the PSD 1. The discrete pulses are amplified and optimised, the resultant signal being further processed and a feedback mechanism being provided to adjust the flight vehicle trajectory and direct it to the target. The control electronics uses AC peak detecting circuitry for detecting the pulses output by the position sensitive detector. The control electronics 5 extrapolates position independently of output magnitude by analysis of temporal response variation across the device. The control electronics includes AC peak detecting circuitry for detecting the pulses output by the PSD 1.

In an exemplary embodiment, the position sensitive detector could be hybridised with the control circuitry to provide speed of read out advantage and reduction of noise on the signal.

The use of a resistive transimpedance amplifier in association with a PSD provides several benefits. Firstly, the above mentioned system produces an impulse output based upon a high percentage of the energy in the input pulse thus improving the temporal response and hence improving the estimate of the position of the true target.

Studying the impulse response output enables the system to resolve discrete pulses of very short duration, for example 20 nanoseconds.

The PSD experiences a higher bias voltage which may decrease the lifetime of the overall device. However, use of an unusually increased bias voltage further improves the response of the system by increasing the percentage of incident energy collected from a pulse of a given duration. This unexpected response can require the PSD to be operated outside limits specified by the manufacturers of the PSD. However, this results in the improvements described above.

Additionally, the bias voltage applied may then be used as a dynamic range control for the device.

The power supply for the device may be standard 12V, ±5V, 3.3V and 3V supplies. However, power supply filtering is not essential.

The PSD bias voltage may be generated externally and provided to the device. This is to enable maximum test flexibility. Note that the control electronics may provide the necessary PCB area and tracking to retrospectively implement a bias generation circuit within the device. In this case the bias voltage would be derived from the 12V supply.

The PSD used in the target tracking device in this embodiment of the invention is optimised for 1064 nm radiation. However, it will be appreciated that any suitable PSD may be used and its mechanical and electrical properties optimised for any other suitable wavelength of radiation. However, it should be noted that corresponding optimisation of the control electronics may be required.

The device shall be optimised for 1064 nm radiation but may be optimised for any other suitable radiation.

Preferably, the optical lens system should give the PSD a 20°×20° field of view. If possible alternative interchangeable optics should be available to allow the system to also have a 10°×10° field of view. If a 20°×20° field of view cannot be feasibly achieved then the 10°×10° field of view can be used as the primary requirement.

It will be appreciated that these values are specific to a first form of the invention. However, the device may be used with an optical system of appropriate design to suit the specifics of the application.

A narrow bandpass filter may be used to limit the number of spurious signals and noise that the PSD receives. Preferably, a narrow pass band with nominal centre wavelength 1064 nm filter shall be included in front of the optics. The filter bandwidth should be 40 nm full width at half maximum (FWHM).

Preferably, total transmission at 1064 nm shall exceed 70% and should exceed 80%.

Whilst the optical focus of the system is not a key issue (as the PSD output is related to the energy centroid) any defocus should be as circularly symmetrical as possible and the spot size should be less than 1% of the PSD size.

It will be appreciated that the description above is one embodiment of the invention. Additional features, for incorporation into the device, that add functionality to the fundamental invention will now be described.

The bias voltage applied to the PSD may be varied in real time in response to the signal level the target tracking device is receiving. By lowering or raising the bias voltage as appropriate the PSD can be kept at the optimum sensitivity for longer or enable the dynamic range of the system to be increased.

The PSD will have an optimum temperature to operate at for best sensitivity. By attaching a thermoelectric cooler/heater (or by some other method) the PSD could be kept at this temperature at all times (or at specific times deemed best for a particular application). An additional benefit of this is that the PSD could be made to operate over a greater range of external environmental conditions.

Due to the physical size of the device and the fact that the radiation spot will be falling on different parts of the device there could be a slight difference in time between the read outs of the signals coming out of each side of the device. For example if the laser spot falls near the left edge of the device the signal will perhaps appear on the left electrode slightly before the right electrode. Therefore, the actual temporal response characteristic of the device may vary to a useful extent across the device due to the inherent variation in impedance across the PSD active area. Therefore measuring the temporal behaviour of the output will give a means of determining the incident position of radiation independently of the output magnitude values. It is possible that this slight timing difference could be used to improve the standard position measurement made by the PSD.

The raw accuracy with which the position of the incident radiation can be measured will inherently be optimised within a given range of incident signal magnitude. To maintain the optimum signal level for the device the standard method of gain ranges could be augmented with constantly varying attenuation of the optical signal via an iris or any other physical means of reducing the signal reaching the PSD.

Furthermore, the PSD could be hybridised with the amplifier circuitry to provide some speed of read out advantage and reduction of noise on the signal.

The invention claimed is:

1. A target tracking device for a flight vehicle comprising:
   a position sensitive detector for detecting radiation reflected off the target, the detector having at least two signal outputs, the signal outputs being processed by control electronics, the control electronics sampling and amplifying the impulse response of the position sensitive device such that the flight vehicle is guided toward the target; and
   a voltage source that applies a bias voltage to the position sensitive detector.

2. The target tracking device according to claim 1, in which the control electronics includes a resistive transimpedance amplifier, the amplifier sampling pulses and outputting signals representative of the position of the incident radiation on the detector.

3. The target tracking device according to claim 1, wherein the voltage source is an external source whose bias voltage improves a temporal response of the detector.

4. A target tracking device according to claim 3, in which the bias voltage applied to the position sensitive detector is variable in real time in response to the signal level the position sensitive detector is experiencing, thereby acting as a dynamic range control for the device.

5. The target tracking device according to claim 1, wherein the control device extrapolates position independently of output magnitudes by suitable analysis of temporal response variation across the device.

6. The target tracking device according to claim 1, in which the control electronics comprises AC peak detecting circuitry, for detecting the pulses output by the position sensitive detector.

7. The target tracking device according to claim 1, comprising:
   a thermoelectric cooler that maintains the position sensitive device at a constant temperature, thereby enabling operation of the device over a greater range of external environmental conditions.

8. The target tracking device according to claim 1, comprising:
   an iris of an optical lens system that constantly varies an attenuation of the incident radiation to attain an optimum signal level at the position sensitive detector.

9. The target tracking device according to claim 1, in which the position sensitive detector is hybridised with the control circuitry to provide speed of read out advantage and reduction of noise on the signal.

10. The target tracking device according to claim 1, wherein the voltage source is a bias generation circuit that applies a bias voltage to the position sensitive detector.

11. The target tracking device according to claim 10, wherein the bias generation circuit is included in the control electronics.

12. A method of tracking a target comprising the steps of
(a) illuminating the target with radiation of a suitable wavelength;
(b) detecting radiation reflected or emitted by the target using a position sensitive detector;
(c) inputting the pulses output by the position sensitive detector in response to the incident radiation, into a resistive transimpedance amplifier; and
(d) analysing the data output by the amplifier using suitable control electronics, the subsequent data produced being used to alter the trajectory of a flight vehicle incident on the target.

13. The method according to claim 12 further comprising the step of analysing temporal response variation across the device such that position is extrapolated independently of output magnitudes.

14. A method of tracking a target comprising the steps of:
(a) illuminating the target with radiation of a specified wavelength;
(b) detecting radiation reflected or emitted by the target using a position sensitive detector;
(c) inputting the pulses output by the position sensitive detector in response to the incident radiation, into a resistive transimpedance amplifier; and
(d) analysing the data output by the amplifier using control electronics, wherein the data produced from the analysis is used to alter a trajectory of a flight vehicle guided towards the target.

* * * * *